United States Patent [19]
Kocher et al.

[11] 3,962,558
[45] June 8, 1976

[54] METHOD AND APPARATUS FOR DRILLING WATCH JEWELS OR OTHER WORKPIECES BY MEANS OF LASER BEAMS

[76] Inventors: Ernst Kocher, Bayweg 11, 3123 Belp; Jürg Steffen, Bernstrasse 49, 3122 Kehrsatz; Gerd Bernd Herziger, Wiesenstrasse 4, 3073 Gumligen, all of Switzerland

[22] Filed: Mar. 18, 1974

[21] Appl. No.: 452,379

Related U.S. Application Data

[63] Continuation of Ser. No. 238,777, March 28, 1972, abandoned.

[30] Foreign Application Priority Data

Mar. 29, 1971  Switzerland.......................... 4550/71

[52] U.S. Cl. ......................................... 219/121 LM
[51] Int. Cl.² ........................................ B23K 27/00
[58] Field of Search... 219/121 L, 121 LM, 121 EB, 219/121 EM; 331/94.5

[56] References Cited
UNITED STATES PATENTS

| 3,243,724 | 3/1966 | Vuylstete ...................... 219/121 LM |
| 3,289,099 | 11/1966 | Masters........................... 219/121 L |
| 3,297,876 | 1/1967 | DeMaria ......................... 219/121 L |
| 3,521,069 | 7/1970 | DeMaria et al................. 331/94.5 Q |
| 3,527,198 | 9/1970 | Takaoka....................... 219/121 LM |
| 3,546,620 | 12/1970 | Erickson et al................ 331/94.5 Q |
| 3,577,097 | 5/1971 | Hilberg ......................... 331/94.5 Q |
| 3,601,576 | 8/1971 | Schlafli ......................... 219/121 LM |
| 3,622,739 | 11/1971 | Steffen et al.................... 219/121 L |
| 3,694,768 | 9/1972 | Young .......................... 331/94.5 Q |

OTHER PUBLICATIONS

Elektro–Anzeiger; vol. 22, 1969, p. 157.
Umschau, 1970, Issue 3, p. 83.
Proceedings of the IEEE, Feb. 1969, p. 126.
"Laser" by Kleen and Muller edited by Springer–Verlag, 1969, pp. 137–14 154.
"Lasers Light Amplifiers and Oscillators" by Ross 1969, pp. 221–234, 272–322, 347–379, 383–455.

Primary Examiner—J. V. Truhe
Assistant Examiner—G. R. Peterson
Attorney, Agent, or Firm—Haseltine, Lake & Waters

[57]  ABSTRACT

In order to drill holes in watch jewels or the like a laser beam is produced having pulses in which successive spikes are formed with a substantially constant period, the first spike being greater in intensity than the subsequent spikes which can have equal or diminishing intensities.

4 Claims, 7 Drawing Figures

METHOD AND APPARATUS FOR DRILLING WATCH JEWELS OR OTHER WORKPIECES BY MEANS OF LASER BEAMS

CROSS-REFERENCE TO RELATED APPLICATIONS

This application is a continuation of Ser. No. 238,777, filed Mar. 28, 1972, now abandoned.

BACKGROUND a. Field of the Invention

The invention relates to methods and apparatus for drilling workpieces by laser beams, and particularly watch jewels.

b. Prior Art

It is known to drill workpieces by means of laser beams. However, many difficulties are encountered when uniform, cylindrically shaped holes are desired which conform with exact tolerance requirements, as it is necessary in the drilling operations of watch jewels to minimize the expenses with respect to a subsequent reaming operation, during which the hole is slightly enlarged and polished in a conventional manner.

SUMMARY OF THE INVENTION

An object of the present invention is to provide a method by which holes can be drilled having a larger degree of conformity with the desired hole size as compared to those drilled in accordance with the previous methods. The method of the invention is based on a thorough study of the causes of non-uniformity of the holes which have been heretofore produced by conventional methods, and it is also based on the discovery that the shape of the laser beam pulses used in the conventional methods is primarily responsible for the non-uniformity.

Detailed investigations on the temporal behavior of the absorption of laser light in transparent or in high reflective materials and of the break-down of the material surface during the influence of intense laser-light has led to a novel method for precision laser material processing.

In FIG. 1, there is shown a laser beam pulse having a conventional shape, wherein the intensity I of the output beam of a laser resonator is illustrated as a function of the time $t$. The pulse consists of a series of spikes or peaks which are distributed in an entirely irregular manner over the duration $tp$ of the pulse. The spikes of the beam have varying intensity values which are also distributed in an irregular pattern. If a spike having a very high intensity reaches the workpiece, a large quantity of the material of the workpieces is suddenly vaporized or melted, whereby droplets or even small particles of solid material are ejected from the hole which is being manufactured. As a result of the excessively strong heating and of the sudden impact forces caused by reaction momentum, small bulges and cracks develop in the immediate vicinity of the drilling hole. If the average intensity of the pulses is reduced, a limit is soon reached, below which the drilling operation can no longer be accomplished or only by using a larger number of pulses.

The method according to the invention is characterized in that the laser beam pulses are provided with a first peak, whose intensity is larger than the intensity of all of the subsequent peaks and that these subsequent peaks follow each other with a substantially constant period and with a decreasing or equal peak intensity.

The intensity of the laser beam pulse can drop to zero between the individual spikes, but this is not absolutely necessary. In case the pulses do not drop to zero, the spikes appear as oscillations with decreasing or equal amplitude, superposed on a base intensity. The aforesaid subsequent pulses can be obtained in laser installations having an extremely stable construction, and the drilling operation can be started only after it has been determined by observation of the pulses on the picture tube of an oscilloscope that the pulses have the desired shape. Preferably, however, a modulator is used in order to determine the period of the peaks following the first peak.

The invention also contemplates apparatus for accomplishment of this preferred drilling method, and the apparatus contemplates that the laser resonator is provided with a modulator, which determines the period of the peaks in the laser beam pulse by modulation of the laser oscillations.

The reason why the intensity of the first spike must be greater, preferably at least three times greater than the intensity of the subsequent spikes is that this first spike must achieve an absorbing state in transparent materials, for instance, rubies, as will be explained in greater detail later. In the same way, the coefficient of reflection of the outer surface of metallic workpieces is substantially reduced by the first spike, serving also the purpose of increasing the absorption of the following spikes.

The uniformity or regularity of the subsequent spikes prevents the development of the above mentioned bulges and cracks in the workpiece at the hole. The applied energy, the duration of the spikes, the interval between the spikes and the intensity of the spikes must be chosen so as to correspond to the properties of the material to be drilled.

Advantageously, the energy of the spikes following the first spike is sufficient for vaporizing one layer of the material to be drilled, the time interval between these consecutive spikes being sufficient for escape of the produced gas or vapor from the hole being drilled, before the next spike reaches the workpiece.

DETAILED DESCRIPTION

Figure 1:
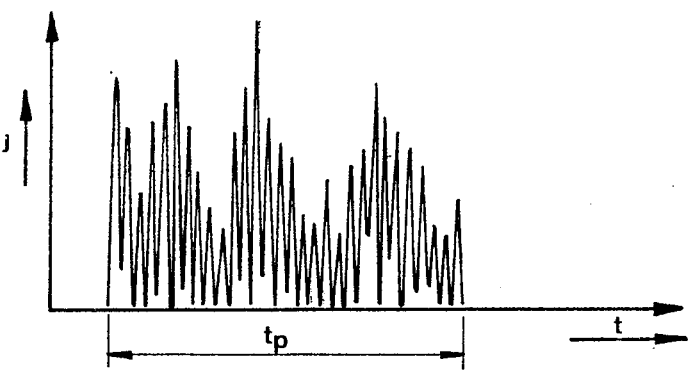
FIG. 1 is a graphical illustration of a conventional laser beam pulse.
Figure 2:
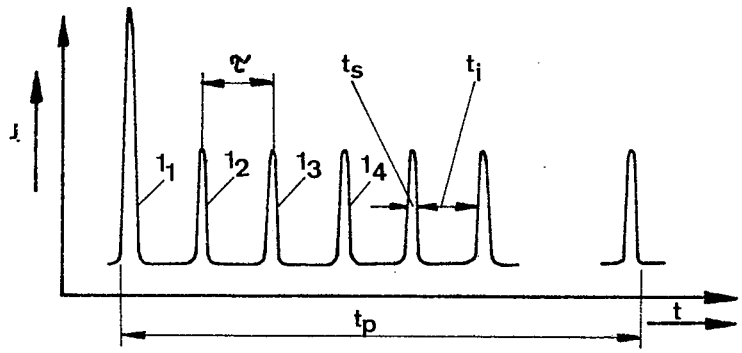
FIG. 2 is a graphical illustration of a laser beam pulse for use in the method according to the invention.

Referring to FIG. 2, therein is shown a laser beam pulse which is suitable for drilling rubies, the illustration being substantially idealized.

It can be seen that the pulse consists of a plurality of spikes 1, whose duration amounts to approximately $t_s$ ~0.5μs. The time interval $t_i$ between two consecutive peaks is approximately equal to 3μs. Consequently, the period τ of the spikes is $t_s + t_i = 3.5$μs. The duration of the pulse amounts to, for instance, approximately 110μs. It is worth mentioning in this connection that $t_s$ as well as $t_i$ are not measured at the base, but at the mid-height of the spikes. In order that the pulse is suitable for drilling operations on watch jewels such as rubies, it is important that the duration of spikes $t_s$ is relatively short, for instance amounting to approximately 0.5 to 2μs and that the energy of the spikes is sufficiently large, amounting to, for instance, 1 m Joule. The interval between the consecutive spikes is chosen so as to be sufficiently large in order to allow the material, which has been vaporized at the arrival of one spike, to escape from the already created portion of the drilling hole before the arrival of the next spike. On the other hand, $t_s$ should not be so long that the heat transfer in the surrounding material would be allowed to play an important role. Furthermore, the maximum intensity of the peaks must not be too great, for instance, $I_s < 10^9$ W/cm², in order to avoid the development of shock waves or non-linear optical processes.

Figure 4:
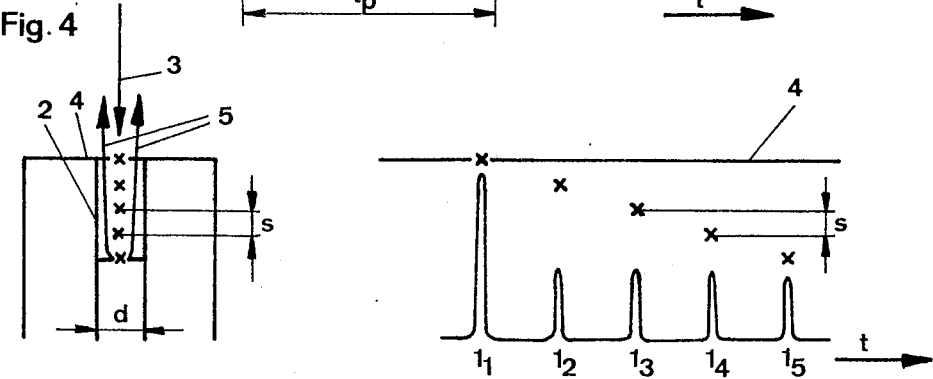
FIG. 4 is a schematic illustration of the drilling process.

At the left side of FIG. 4, there is schematically illustrated a hole 2 being drilled and at the bottom of which the fifth spike of a laser beam pulse has just arrived, the points of the first contacts of the previous consecutive spikes with the material to be drilled being indicated with crosses. The thickness of the layer of the material which is vaporized by every spike is characterized as $s$ and the diameter of the drilling hole is specified as $d$. On the right side of the FIG. 4, there are illustrated the points of the first contact of the individual spikes with the material to be drilled and these spikes $1_1$ to $1_5$ themselves are shown as a function of time, corresponding to a cinematographic recording of the drilling process in a direction perpendicular to the beam 3, with simultaneous recordation of the pulse in an oscillagraph. The upper surface of the ruby is designated as 4. The arrows 5 denote the escape of the material vaporized by the peak $1_5$. Any newly arriving spike does not meet any vapor in the drilling hole 2, this being of great advantage as the vapor has a dispersing influence on the laser beam.

Figure 5:
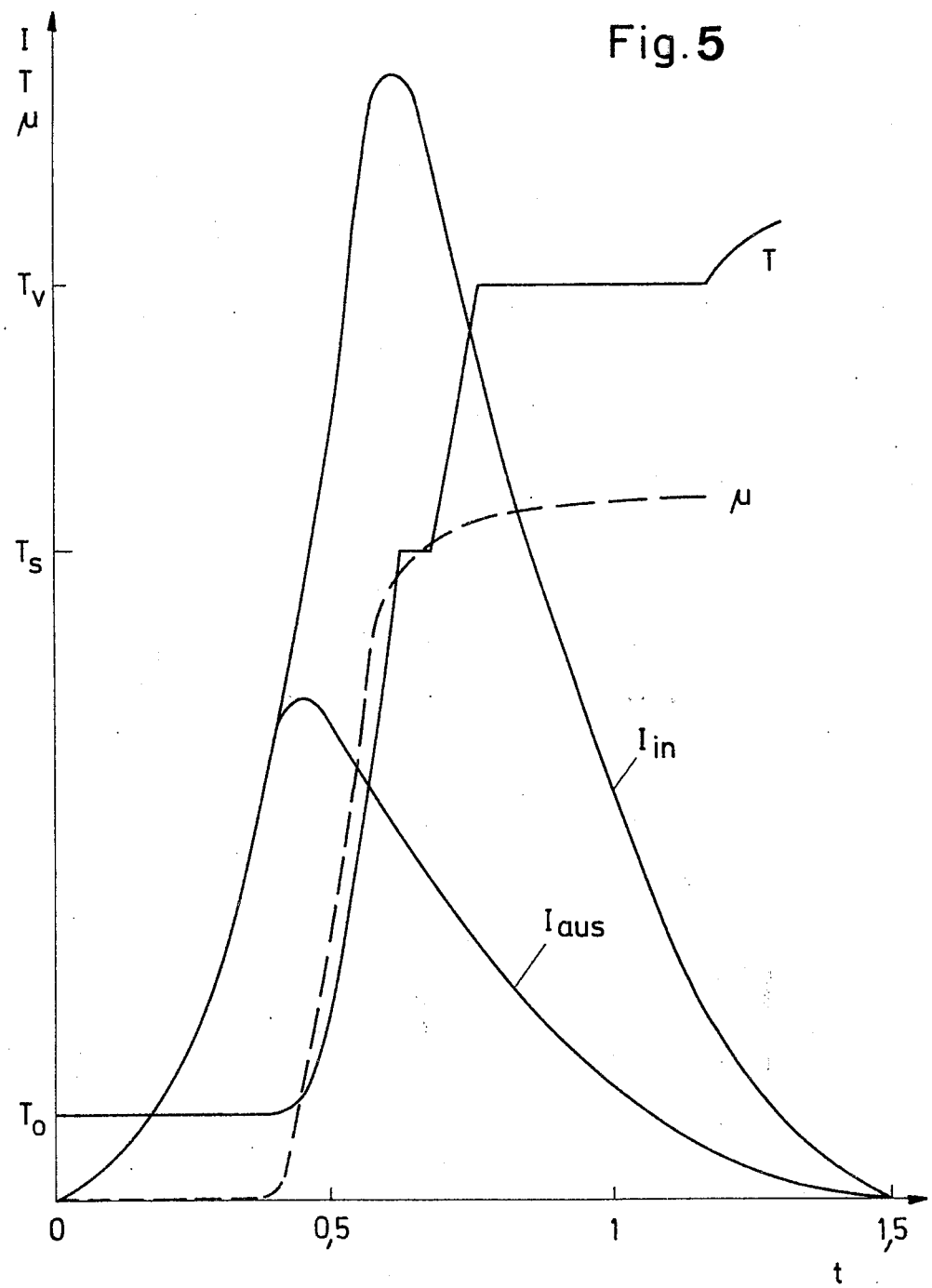
FIG. 5 is a diagrammatic illustration for explanation of the influence of the first spike on a transparent material such as a ruby.

Since the ruby is transparent, i.e. it has a very small light absorption coefficient, it is not readily understandable how it is possible for it to be vaporized by a light beam. The reason for this has been found in the fact that the absorption coefficient μ of ruby and similar gem stones is dependent on the temperature thereof in accordance with the exponential function.

$$\mu(T) = k \cdot -\frac{\alpha}{T} e$$

wherein T is the absolute temperature of the material and K and α are constants inherent to the material. The following values have been established for the constants k and α for ruby from experimental data:

$\alpha \approx 1 \cdot 10^3$ to $4 \cdot 10^3$ $k \approx 6 \cdot 10^3$ to $2 \cdot 10^3$ In FIG. 5, there are shown the intensity $I_{in}$ of a spike arriving at the ruby and the intensity $I_{aus}$ of the spike transmitting through the same, as a function of time $t$. Furthermore, there is also shown the behavior of the absorption coefficient μ and the temperature T of the material surface hit by the spike. At room temperature $T_o$, μ is close to zero (for instance, approximately 1% per cm of the thickness of the specimen), so that $I_{aus}$ almost coincides with $I_{in}$. However, when the material warms up as a result of the very small absorption to some small degree, μ increases significantly, which results in a very steep increase of the absorption and, consequently, also the temperature T of the material. At the melting temperature $T_s$, the curve T shows a small step, which is very rapidly surpassed, and a somewhat longer step is seen at the vaporizing temperature $T_v$. The last increasing portion of the T-curve, which describes the state of the superheated vapor, is not to be taken into consideration since the vapor escapes from the drilling hole 2 in the direction of the arrows 5 as shown in FIG. 4. The reason why only a very small volume of material is vaporized by any one of the spikes, can be explained by, and is based on, the absorption law, $$I(x) = I_{in} e^{-\mu \cdot x}$$

wherein $x$ is the depth of penetration of a light beam in the material and $I(x)$ is the intensity at the point $x$.

If the behavior of temperature in the material below the point where the beam comes into contact with the material is computed from the above function and from the relations or equations for μ and T as explained with reference to FIG. 5, it can be established that practically the entire development of heat is concentrated in a very thin layer having a thickness of approximately 20μ. The thickness of this layer is determined, in general, by the properties of the material to be drilled and, consequently, it is of a decisive importance that the laser emission, i.e. the energy of the spikes, the duration of the spikes, the interval between spikes, and the shape of the pulse are conformed to the properties of the material to be drilled. From the above, the fact, which has been already explained with reference to FIG. 4, that each spike 1 erodes only one layer of the material to be drilled, whose thickness, consequently, amounts to approximately 20μ, can easily be explained. The number of the spike which are needed for drilling a continuous hole, and, consequently, also the duration of the pulse $t_p$, substantially depend on the length of the desired drilling hole.

In order to start the drilling process on a relatively rough, strongly dispersing or on a highly polished surface 4, it is advantageous for the first spike $1_1$ to be substantially larger, for instance, approximately 3 to 5 times greater in intensity than the subsequent spikes. A large level of energy of the first spike can be achieved by providing the output mirror of the laser resonator with a high coefficient of reflection.

Figure 3:
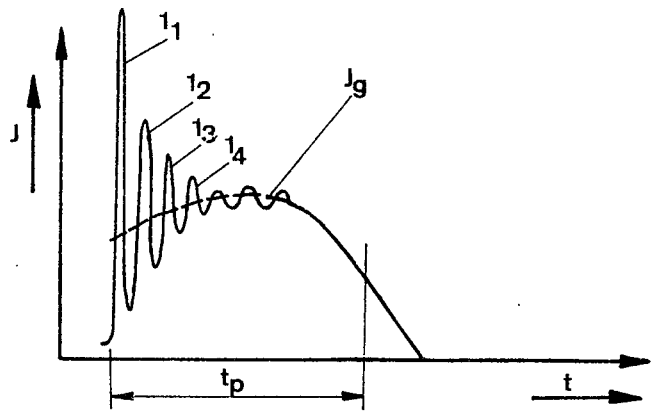
FIG. 3 shows another laser beam pulse which can be used in the method according to the invention.

In FIG. 3, there is shown a laser beam pulse, which is also suitable for drilling holes complying with prescribed measurements. It is evident that the intensity of the spikes $1_2$, $1_3$ . . . immediately following the first spike $1_1$ having a very large intensity, decreases rapidly, and the intensity of the pulse between these spikes does not drop to zero, so that a curve of an oscillation having a rapidly dying out amplitude results, superposed on a basic intensity $I_g$. If such a pulse is used, the material of the drilling core is also eroded layer-wise, at least at the beginning of the drilling operation.

Moreover, the layer-wise erosion apparently also continues during that portion of the pulse which shows practically no substantial superposed oscillations for the reason that the laser beams are absorbed for limited periods of time by the vaporized material escaping from the drilling hole, and can only reach a new layer of the material after the dispersion of this vapor cloud and thus vaporize the said further layer, whereupon the whole process is repeated again.

Figure 6:
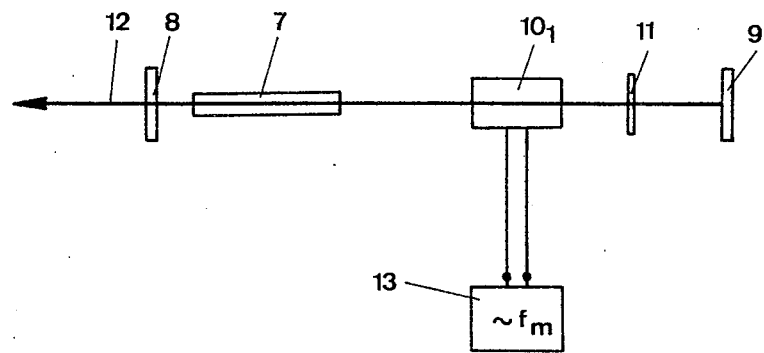
FIG. 6 is a diagrammatic illustration of a laser resonator with internal modulation by means of a Kerr cell or a similar modulator.

In FIG. 6, there is shown apparatus by which pulses can be produced whose characteristics substantially correspond to those shown in FIG. 2. According to FIG. 6, a laser resonator is provided with a laser rod 7, which is arranged in a conventional manner between two mirrors 8 and 9. A Kerr cell 10, and a polarization filter 11 are located between the laser rod 7 and the mirror 9. The effective beam 12, which is used for the drilling operation, is emitted from the mirror 8, which has a reasonably high coefficient of reflection, amounting to, for instance, approximately 80 to 90% in order to achieve a strong first spike. The pumping means, for instance, a flash-light lamp by which the laser rod 7 is excited, is not shown. The Kerr cell $10_1$ is connected to a source 13 of alternating voltage with adjustable frequency, the frequency being chosen so as to correspond to the desired repetition period of the spikes $1_2$, $1_3$ ... i.e. $f_m = 1./\tau$ The polarization of the beam passing through the Kerr cell $10_1$ is changed by the cell, so that the intensity of the beam allowed to pass through the polarization filter 11 and reflected back and forth between the mirrors, and, consequently, also the intensity of the effective beam 12, is modulated by frequency $f_m$, which results in the periodic creation of the spikes $1_2$, $1_3$ ... with the period. Instead of a Kerr cell, a pockel cell or a saturable absorber can be used.

Figure 7:
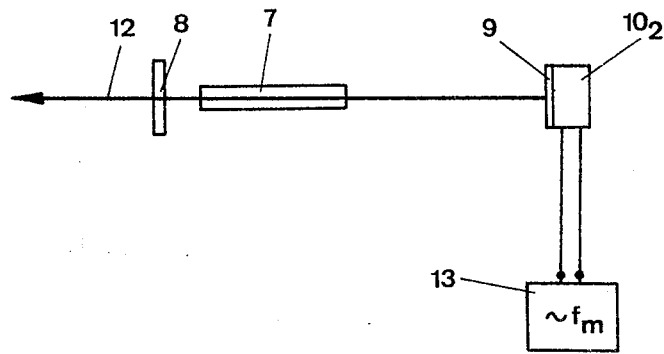
FIG. 7 is a diagrammatic illustration of a laser resonator with output modulation by means of a piezoelectric crystal.

The arrangement according to FIG. 7 differs from that in FIG. 6 only by the fact that a piezoelectric crystal $10_2$ is used as the modulator, the mirror 9 being mounted on the crystal $10_2$. Consequently, the mirror will be moved in back and forth direction at a rate corresponding to the modulation frequency, so that the distance of the mirrors 8 and 9 from each other varies. The standing wave between these mirrors is distorted regularly resulting in a spiking as shown in FIG. 2.

An acoustic-optical modulator can also be used as the modulator, i.e. a modulator having an optical medium through which the laser beams pass and in which standing acoustic waves are induced whose frequency is modulated so that the beams are directed in the rate of this frequency, which results in an amplitude modulation of the effective beam.

Of course, the invention is not limited to drilling operations for watch jewels. In particular, metallic workpieces can be drilled in accordance with the present method. The magnitude and the time succession of the peaks and of the pulses consisting of these peaks, which is necessary for the respective process, can be computed from the relations explained previously with reference to FIG. 5, or estimated, or established by experiment. In the process of manufacture of certain metallic workpieces, for instance, spinning nozzles, it can possibly be desirable to achieve special shapes of the drilled holes. Even though the use of laser beams oscillating only in the fundamental transverse mode is generally desirable, in this case even the use of a laser beam oscillating with a higher transverse mode may be advantageous.

What is claimed is:

1. A method for drilling holes in workpieces which are highly transparent or highly reflective to laser light, said method comprising applying a single laser pulse to the workpiece, forming the laser pulse with a plurality of spikes, the intensity of the first of these spikes being greater than that of all subsequent spikes and said subsequent spikes follow each other with a substantially constant period, providing the first spike with an intensity sufficient to vaporize a surface layer of the material of the workpiece, providing the subsequent spikes with sufficient energy such that each vaporizes a layer of material having a thickness of approximately 20 $\mu$m so as to form a hole in the workpiece, and maintaining the period between said subsequent spikes sufficiently large such that the vaporized material produced by a previous spike has escaped from the hole being formed before the next spike arrives at the workpiece, said spikes having an energy of approximately 1 m Joule, the duration of the spikes being approximately 0.5 $\mu$sec, the period between the spikes being approximately 3 $\mu$sec and the peak intensity being less than $10^9$ W/cm2.

2. A method as claimed in claim 1 wherein said subsequent spikes having intensities of the same order of magnitude.

3. A method as claimed in claim 1 wherein said subsequent spikes have intensities with exponentially decreasing intensity.

4. A method as claimed in claim 1 comprising displaying time development of the laser pulses on an oscilloscope and commencing the drilling operation after the laser system has reached a stationary state in which the pulses have reached the desired shape and are mutually equal.

* * * * *